United States Patent [19]

Baartman

[11] Patent Number: 5,354,522

[45] Date of Patent: Oct. 11, 1994

[54] METHOD OF BENDING A LAMINATE HAVING A THERMOPLASTIC CORE LAYER AND METAL SHEETS ON EACH SIDE

[75] Inventor: Reinier Baartman, Alkmaar, Netherlands

[73] Assignee: Hoogovens Groep BV, IJmuiden, Netherlands

[21] Appl. No.: 89,643

[22] Filed: Jul. 12, 1993

Related U.S. Application Data

[63] Continuation of Ser. No. 766,272, Sep. 27, 1991, abandoned.

[30] Foreign Application Priority Data

Oct. 1, 1990 [NL] Netherlands .................... 9002134

[51] Int. Cl.⁵ ..................... B29C 35/00; B29C 53/00
[52] U.S. Cl. .................... 264/25; 72/342.94; 264/295; 264/322
[58] Field of Search ............ 264/25, 295, 322, 339; 72/342.1, 342.94

[56] References Cited

U.S. PATENT DOCUMENTS

| | | |
|---|---|---|
| 3,977,932 | 8/1976 | Fries et al. . |
| 4,160,006 | 7/1979 | Patzner et al. ............ 264/322 |
| 4,184,905 | 1/1980 | Ogata et al. ............. 264/322 |
| 4,292,830 | 10/1981 | Trishevsky et al. ........ 72/342.1 |
| 4,583,935 | 4/1986 | Frey . |
| 4,671,985 | 6/1987 | Rodrigues et al. .......... 428/215 |
| 4,756,863 | 7/1988 | Petershofer ............. 264/322 |
| 4,759,815 | 7/1988 | Frey ................... 264/322 |
| 4,885,317 | 12/1989 | Thein et al. ............. 264/322 |
| 5,043,127 | 8/1991 | Brambach ............... 264/322 |

FOREIGN PATENT DOCUMENTS

| | | |
|---|---|---|
| 0115103 | 8/1984 | European Pat. Off. . |
| 0184549 | 10/1985 | European Pat. Off. . |
| 0281339 | 9/1988 | European Pat. Off. . |
| 13146 | 7/1990 | European Pat. Off. . |
| 53-144976 | 12/1978 | Japan . |
| 1220080 | 1/1971 | United Kingdom . |

OTHER PUBLICATIONS

English Translation of Japan 53-144,976 (Published Dec. 16, 1978).
Y. Kamimoto, Patent Abstracts of Japan vol. 9, No. 307 (M-435) [2030]Dec. 1985.

*Primary Examiner*—Leo B. Tentoni
*Attorney, Agent, or Firm*—Stevens, Davis, Miller & Mosher

[57] ABSTRACT

Bending a laminate having a thermo-plastic core layer and metal sheets adjoining the core layer on both sides, is performed by heating the laminate and then bending it. To allow bends of small radius to be made, heating causes softening of at least one of the boundary regions of the core layer adjoining the metal sheets, while a central region of the core layer remains unsoftened. The heat may be by inductive heating of one or both metal sheets.

8 Claims, 1 Drawing Sheet

METHOD OF BENDING A LAMINATE HAVING A THERMOPLASTIC CORE LAYER AND METAL SHEETS ON EACH SIDE

This application is a continuation application of application Ser. No. 07/766,272, filed Sep. 27, 1991, now abandoned.

BACKGROUND OF THE INVENTION

1. Background of the Invention

The invention relates to a method of bending a laminate having a thermo-plastic core layer and metal sheets adjoining the core layer on both sides, wherein the laminate is heated and then bent while hot.

2. Description of the Prior Art

EP-A-0013146 describes numerous laminates which have a plastic core layer and metal skin layers on both sides. A problem with these known laminates is that their deformability is moderate and that even a simple bending operation for making an angle of 90° with a bending radius equal to two times the thickness of the laminate is often not possible without causing damage to the laminate. EP-A-0013146 mentions, as a possible solution, the heating of the laminate, but is has been found that in many cases this only leads to a slight improvement in deformability.

Especially when the laminate is given a bend with a bending radius of the same order as thickness of the laminate, it is generally not possible to do so without cracking the outer metal skin. Such small bending radii are used, for example, in laminates for car body parts, wherein an edge suitable for seaming has to be made. In such a case the laminate may comprise, for example, a core layer of acrylonitrile-butadiene-styrene (ABS), polyethylene terephthalate (PET) or polypropylene (PP), and for the skin layers steel or aluminium may be used. Examples of such laminates are described in copending application Ser. No. 07/759,915, filed Sep. 13, 1991, now abandoned, and divisional application Ser. No. 07/958,596, filed Oct. 8, 1992, now U.S. Pat. No. 5,306,566 issued Apr. 26, 1994 claiming priority from Dutch application Ser. No. 9002022 of Sep. 14, 1990, the contents of which are here incorporated by reference. Particularly described is a laminate composed of a core layer of 0.8 mm thick ABS which is provided on each side with a 0.2 mm thick aluminium skin layer.

When bending this laminate the problem occurs that the laminate behaves more or less as an integral aluminium sheet with a thickness of 1.2 mm. This means that, when making a bend with a very small external radius of curvature, for instance, about 1.5 mm, the metal skin layer at the outside of the bend must be stretched beyond its elastic limit. The result of this is that this outside metal skin layer tends to crack. Heating the laminate, as described in the prior art, does not always prevent this and in some cases it can lead to permanent and undesired change in the physical properties of the laminate.

Other prior art does not provide a method which solves this problem, JP-A-53144975 (abstract) refers to a processing method in which a laminate with thermoplastic core, metal sheets on both faces of the core and a thermosetting resin layer on one metal sheet, is locally heated to above a temperature at which the core layer softens.

In U.S. Pat. No. 4,583,935 a similar method of bending a thermoplastic laminate (without metal skin) is discussed in which localized heating to cause softening of the thermoplastic material is applied only to part of the laminate to be bent. The rest of the laminate remains in a hardened state throughout the bending process. The laminate is heated to a temperature at which ply slippage can occur.

SUMMARY OF THE INVENTION

The object of the invention is to solve this problem and to provide a method by which laminates of the kind described in the first paragraph above may be deformed better and in a simple manner to give them a bend with a small external bending radius.

The method in accordance with the invention is characterized in that at least one of the boundary regions in the thermo-plastic core layer which adjoin the two metal sheets is heated so as to be softened, while a central region of the whole core layer remains unsoftened at the region of the bend. Surprisingly it has been found that, in accordance with the invention, the laminate may be worked, in the bending process, virtually as an integral metal sheet, the thickness of which corresponds with that of just one of the metal skin layers of the laminate. Consequently the bending radius which can be made may be much smaller than with the known processes described, and in a simple manner and without significant deterioration of the laminate.

It is believed that the invention produces this surprising result because heating at least one of the boundary regions enables displacement of the corresponding metal sheet over the core layer without permanent damage to it remaining after the bending operation. Following cooling, the laminate is found to possess essentially the same physical properties as before the bending operation.

It is preferable to heat at least the boundary region adjoining the metal sheet which will be at the outer side of the bend (i.e. the sheet which will have the larger radius of curvature). More preferably both boundary regions of the plastic core layer adjoining the two metal skin layers are heated. In this case the laminate bends under lower forces. The boundary layer in each case which is softened has a thickness which is preferably not more than 25% of the core layer thickness.

In an advantageous embodiment, at least a first of the metal skin layers is heated in such a way that at the same time the adjoining boundary region of the plastic core layer is heated. This may take place, for example, by heating the bending die in the apparatus for carrying out the method, for example a bending tool, up to a desired temperature and bringing the laminate into contact with it so that it is heated by the die. However, if both boundary layers of the laminate are to be softened, it is preferable for both the metal skin layers to be heated prior to bending the laminate. This has the added advantage that the shape of the laminate bend achieved following the operation is also better retained.

In an alternative embodiment, the boundary region or boundary regions of the plastic core layer is heated by inductive heating of one or both metal skin layers. From an energy use standpoint this is a preferable solution, and the product is better.

When the method is applied to a laminate, the plastic core of which is amorphous, the laminate is suitably heated to achieve a temperature in the boundary region or regions approximately equal to the softening temperature of the plastics material of the core. When acrylonitrile-butadiene-styrene (ABS) is used as core layer material, it is desirable to heat to achieve a temperature in the boundary layer in the range 150° C.–190° C.

When the method is applied to a laminate with a core layer of crystalline material, heating suitably takes place to achieve a temperature in the boundary layer which is approximately equal to the melting temperature of the plastics material of the core.

By the method in accordance with the invention therefore, in a simple and reproducible manner a laminate is obtained that retains its inner cohesion despite the drastic bending process performed on it.

BRIEF INTRODUCTION OF THE DRAWINGS

Embodiments to the present invention will now be described in more detail, by way of non-limitative example, with reference to the accompanying drawing, in which:

FIG. 1 is a schematic view of a known apparatus, as employed in a method embodying the invention; and FIG. 2 is a graph showing some acceptable limits for the performance of the invention in this embodiment.

DESCRIPTION OF THE PREFERRED EMBODIMENTS

A method of producing a bend in a metal-thermoplastic-metal laminate embodying the invention will now be described.

Figure 1:
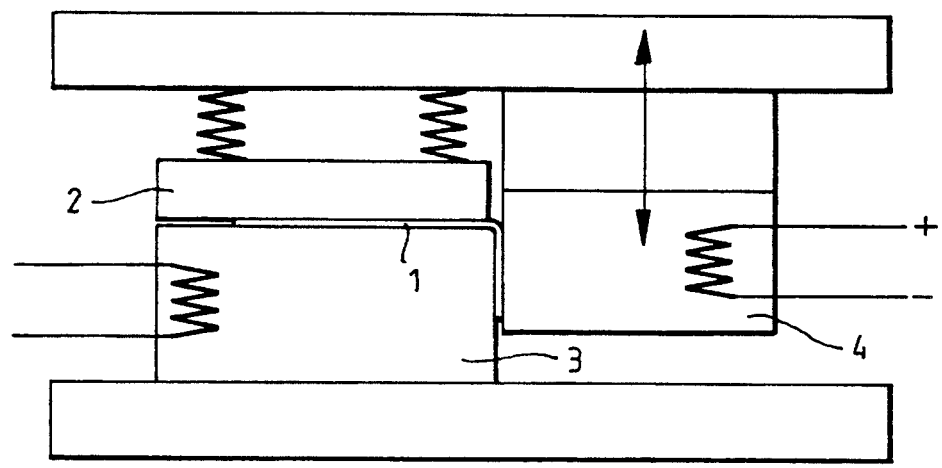

Metal-thermoplastic-metal laminates having metal skin sheets of aluminium 0.2 mm thick on each side of a thermoplastic core 0.8 mm thick, made as described in the co-pending application mentioned above, were subjected to bending to form a 90° bend with an inner radius of 1 mm. Three different kinds of laminate having respectively three different core materials, ABS, PETPE (polyethyleneterephthalate-polyethylene) and PP, were used. Inductive heating of the whole area of both metal sheets was perfomed simultaneously by holding the laminate in the large magnetic coil of an Elva-Minimac induction heater for the selected period in each case. Immediately after this heating, the laminate was transferred into a TUWI press of known type, whose operation is schematically illustrated in the attached FIG. 1. FIG. 1 shows the heated laminate 1 clamped between a spring-pressed holder 2 and a lower die 3 with its edge projecting. A stamp 4 is then moved downwardly to bend the projecting edge of the laminate around a curved corner of the die 3. After a suitable period, the bent laminate is released. Both the die 3 and the stamp 4 are electrically heatable, as indicated. The duration of the transfer period from the end of the heating in the induction heater to the bending operation in the press was 5 seconds, but this period may be varied, as mentioned below.

This bending operation was performed for the various laminates under varying conditions. The conditions were selected so that the state of the laminate, when bent, was in some cases accordance with the method of the present invention and in other cases outside the present invention. The best results were found for the case where there is slippage during bending between the aluminium and the thermoplastics core at at least one of the interfaces between them, while at the same time the core is not completely softened. This is the method according to the invention. After bending, at the laminate edge, one metal sheet edge may be slightly displaced from the other.

Figure 2:
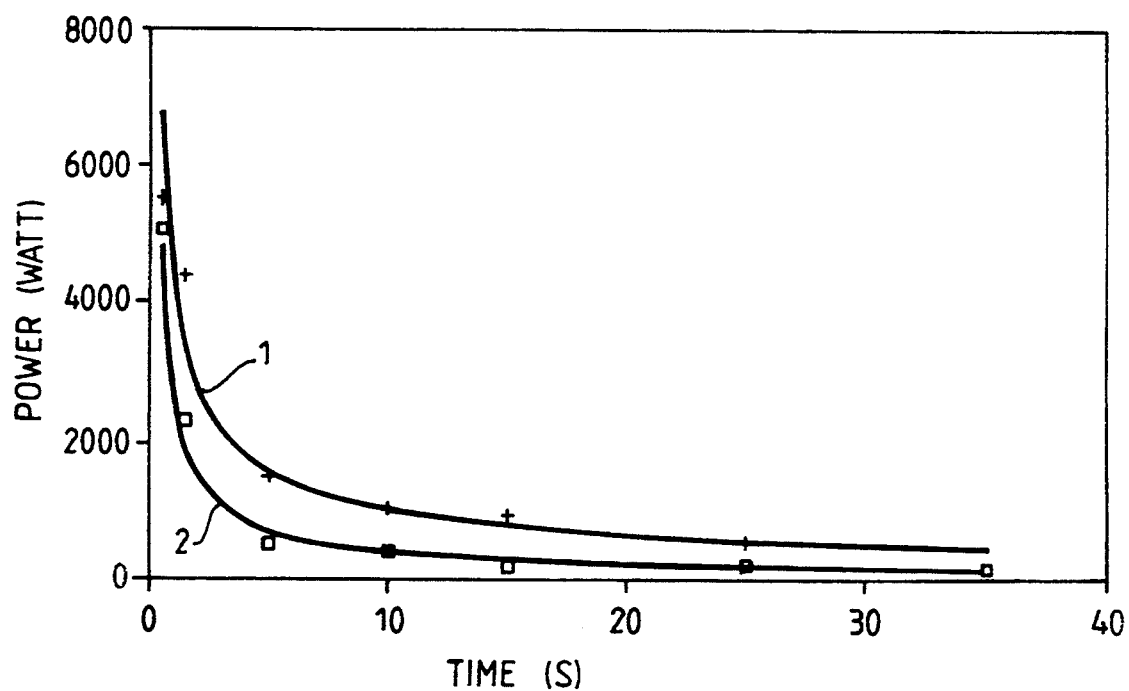

For a bending process involving forming a bend as described above at a location 1 to 2 cm from the edge of the laminate having an ABS core, acceptable limits found for the inductive heating step are given in FIG. 2, which plots the inductive heating power (watts) against heating time (seconds). Line 1 in this graph indicates the upper limit and line 2 the lower limit of the range found acceptable for this particular case. FIG. 1 shows that the optimal region, for ensuring a satisfactory process and product was a heating time of 2 to 10 seconds. These limits for the inductive heating process were found to depend on various factors, e.g. the spacing of the bend region from the laminate edge, the time elapsing between the end of heating and the bending (this time is preferably less than 60 seconds, more preferably less than 20 seconds), and the nature of the thermoplastics of the core. Measurements of peel strength of the resulting products showed that particularly high peel strengths were obtained with the laminates having polypropylene cores.

In an alternative process, the laminate was not heated by induction, but by electrical heating of the die 3 and the stamp 4 shown in FIG. 1 followed by contact of the laminate with these parts. While adequate products can be made in this way, the results are less beneficial than those obtained by the inductive heating process described above, particularly in respect of spring back occurring after bending, which could be as low as 2° on average for inductive heating but was 11° for the electrical heating process.

What is claimed is:

1. Method of bending a metal-thermoplastic-metal-laminate having a thermoplastic core layer and outside metal sheets adjoining the core layer on both sides to a bending radius of the same order as the thickness of the laminate, comprising the steps of heating the laminate so as to effect softening of not more than 25% of the thermoplastic core layer of at least one boundary region of the thermoplastic core layer adjoining the metal sheets while a central region of the core layer remains unsoftened, and then bending the heated laminate.

2. Method according to claim 1 wherein in said heating step at least said boundary region adjoining the metal sheet which is to be at the outside of the bend is softened.

3. Method according to claim 1 wherein said core layer defines two boundary layers and in said heating step both said boundary layers are softened.

4. Method according to claim 1 wherein said heating step is effected by heating at least one of said metal sheets.

5. Method according to claim 1 wherein said heating step is effected by inductive heating of at least one of said metal sheets.

6. Method according to claim 1 wherein said metal sheets are of aluminium.

7. Method according to claim 1 wherein said laminate is flat before the bending and the radius of said metal sheet at the outside of the bend, after the bending, is not more than twice the thickness of said laminate.

8. Method of bending a laminate having a thermoplastic core layer and metal sheets adjoining the core layer on both sides, comprising the steps of:
heating a least one of said metal sheets so as to cause softening of a boundary region of said core layer adjacent thereto, while a central region of said core layer in the thickness direction thereof remains unsoftened, and
bending said laminate while said boundary region is softened as a result of the heating step, so that displacement can occur between at least one of said metal sheets and said core layer during bending.

* * * * *